United States Patent
Gore et al.

(10) Patent No.: US 7,437,450 B1
(45) Date of Patent: Oct. 14, 2008

(54) END-TO-END PERFORMANCE TOOL AND METHOD FOR MONITORING ELECTRONIC-COMMERCE TRANSACTIONS

(75) Inventors: Richard Gore, Santa Clara, CA (US); Joshua Wilmes, Plantsville, CA (US); Alan Conley, Suisun, CA (US); Mehrdad Pirouz, Cupertino, CA (US)

(73) Assignee: Cisco Technology Inc., San Jose, CA (US)

( * ) Notice: Subject to any disclaimer, the term of this patent is extended or adjusted under 35 U.S.C. 154(b) by 902 days.

(21) Appl. No.: 10/007,164

(22) Filed: Nov. 30, 2001

(51) Int. Cl.
*G06F 15/173* (2006.01)

(52) U.S. Cl. .................. 709/224; 709/223; 709/225; 709/232; 702/186; 702/187; 702/188

(58) Field of Classification Search ......... 709/223–225, 709/232, 220; 702/186–188
See application file for complete search history.

(56) References Cited

U.S. PATENT DOCUMENTS

| | | | |
|---|---|---|---|
| 5,761,502 A | 6/1998 | Jacobs | |
| 6,000,045 A | 12/1999 | Lewis | |
| 6,041,352 A * | 3/2000 | Burdick et al. | 709/224 |
| 6,253,339 B1 | 6/2001 | Tse et al. | |
| 6,266,666 B1 * | 7/2001 | Ireland et al. | 707/10 |
| 6,351,812 B1 * | 2/2002 | Datar et al. | 713/182 |
| 6,430,712 B2 | 8/2002 | Lewis | |
| 6,438,707 B1 | 8/2002 | Ronstrom | |
| 6,477,483 B1 * | 11/2002 | Scarlat et al. | 702/186 |
| 6,560,648 B1 * | 5/2003 | Dunn et al. | 709/224 |
| 6,574,272 B1 * | 6/2003 | Peace | 375/222 |
| 6,578,077 B1 * | 6/2003 | Rakoshitz et al. | 709/224 |
| 6,587,077 B2 * | 7/2003 | Vail et al. | 342/374 |
| 6,601,020 B1 * | 7/2003 | Myers | 702/186 |
| 6,675,054 B1 * | 1/2004 | Ruberg | 700/94 |
| 6,711,137 B1 * | 3/2004 | Klassen et al. | 370/252 |
| 6,966,015 B2 | 11/2005 | Steinberg et al. | |
| 6,986,139 B1 * | 1/2006 | Kubo | 718/105 |
| 7,167,912 B1 * | 1/2007 | Dhingra | 709/223 |
| 7,197,559 B2 * | 3/2007 | Goldstein et al. | 709/224 |
| 2002/0107040 A1 * | 8/2002 | Crandall et al. | 455/517 |
| 2002/0120727 A1 * | 8/2002 | Curley et al. | 709/223 |
| 2002/0147937 A1 * | 10/2002 | Wolf | 714/4 |

(Continued)

FOREIGN PATENT DOCUMENTS

WO   WO 01/16753 A2 *  3/2001

(Continued)

*Primary Examiner*—John Follansbee
*Assistant Examiner*—Backhean Tiv
(74) *Attorney, Agent, or Firm*—Stolowitz Ford Cowger LLP

(57) ABSTRACT

A method and apparatus for monitoring electronic commerce transactions. A network delay agent, coupled to the access point for the electronic commerce provider's system is operable to send and receive communications to a designated customer's site for measuring network transport latency. Application test latency is also determined. An application monitor agent that is coupled to the electronic commerce provider's access point sends application tests that correspond to tasks performed during a typical electronic commerce transaction, to the electronic commerce provider's system. The time required for the electronic commerce provider's system to perform the indicated tasks and return a response to the application monitor agent is recorded as application test latency. Network transport latency and application test latency are displayed to indicate the delays that are experienced by a user in executing an electronic commerce order.

15 Claims, 13 Drawing Sheets

U.S. PATENT DOCUMENTS

| | | |
|---|---|---|
| 2002/0191624 A1 | 12/2002 | Onweller et al. |
| 2003/0014464 A1* | 1/2003 | Deverill et al. ............. 709/101 |
| 2003/0061340 A1* | 3/2003 | Sun et al. ..................... 709/224 |
| 2003/0074606 A1* | 4/2003 | Boker .......................... 714/42 |
| 2003/0115508 A1 | 6/2003 | Ali et al. |
| 2003/0149919 A1 | 8/2003 | Greenwald et al. |
| 2004/0015619 A1 | 1/2004 | Brown et al. |
| 2004/0153835 A1 | 8/2004 | Song et al. |
| 2005/0216784 A1 | 9/2005 | Srinivasan et al. |
| 2005/0216785 A1 | 9/2005 | Suzuki et al. |

FOREIGN PATENT DOCUMENTS

| | | |
|---|---|---|
| WO | WO 01/53949 A1 * | 7/2001 |

* cited by examiner

END-TO-END PERFORMANCE TOOL AND METHOD FOR MONITORING ELECTRONIC-COMMERCE TRANSACTIONS

TECHNICAL FIELD

This invention relates to the field of computers and networking. More particularly, the present invention relates to a method and apparatus for monitoring the performance of electronic commerce transactions.

BACKGROUND ART

Electronic commerce orders have increased dramatically in recent years and have grown in importance for many businesses. In the case of complex high-dollar electronic-commerce orders that are made by corporations, it is not uncommon to have such orders entered by a single buyer that is operating a computer. For these transactions, it is very important to make sure that the buyer can quickly and efficiently complete the transaction.

Many of the customer's problems in electronic commerce transactions relate to delays within the network between the customer's computer and the electronic commerce provider's site. More particularly, for communications that are coupled over the Internet, the communications must typically be routed through one or more Internet Service Providers (ISP). Often, communications must be routed through multiple Internet service providers, the customer's Internet service provider and the electronic commerce provider's Internet service provider. In addition, communications are often routed through various third-party ISPs.

Once requests for data are received at the electronic commerce provider's site, the requests are processed so as to obtain a response. Processing of requests so as to provide a response introduces an additional source of potential delays. These delays can occur as a result of transport delays within the electronic commerce provider's network, delays in processing the request, delays in database access, etc. Typically orders are processed using one or more server that configures the products and services according to the customer's needs. The server then processes the order such that the customer can order the previously configured products and/or services.

An exact measure of a customer's electronic-commerce experience is only achievable by an invasive application that resides on the customer's computing device and that directly measures the customer's experience. However, most customers will not allow such invasive programs to be installed on their computing devices. Moreover, such programs only indicate the extent of the problem experienced by the customer. They do not provide the necessary tools for determining the root-cause of the problem experienced by the customer.

What is needed is a way to isolate the root-cause of performance problems in electronic commerce transactions that does not require any monitoring agent on the customer's premises. Also, what is needed is a method and apparatus that meets the above need and that provides for monitoring of delays within the communication network between the customer and the electronic commerce provider's site. In addition, what is needed is a method and apparatus that meets the above needs and that provides for monitoring of delays in processing requests once they are received at the electronic commerce provider's site. Also, a method and apparatus is needed that meets the above needs and that gives meaningful analysis of measured delays so as to allow for easily determining the cause of performance problems. The present invention meets the above needs.

DISCLOSURE OF THE INVENTION

The present invention includes a method and apparatus that allows for isolation of the root-cause of performance problems in electronic commerce transactions. The method and apparatus of the present invention does not require any monitoring agent on the customer's premises. Also, the method and apparatus of the present invention provides for monitoring of delays within the communication network between the customer and the electronic commerce provider's site and delays in processing requests once they are received at the electronic commerce provider's site. Also, the method and apparatus of the present invention provides meaningful analysis of delays so as to allow for easily determining the cause of performance problems.

A method and apparatus for monitoring electronic commerce transactions is disclosed in which the latency between the customer and the electronic commerce provider, hereinafter referred to as network transport latency, is determined. In one embodiment of the present invention, a network delay agent, coupled to the access point for the electronic commerce provider's system is operable to send and receive communications for measuring network transport latency. When customer sites include a Uniform Resource Locator (URL), a http "Head" instruction is sent from the network agent on the electronic commerce provider's network to the customer site URL and the time required for the response to be received is determined. When multiple URL's are available, the URL that is nearest the computing device from which the order is being sent, or the URL that most accurately reflects the travel path of messages from the computing device from which the order is being sent is used. Alternatively, an ICMP "ping" is issued to an IP address that corresponds to the customer's computing device or that is located near the customer's computing device.

Network latency probes are sent to the customer site, and application tests are sent to the electronic commerce provider's system, from the same or nearby location, which is within the provider's internal network and can be considered to be on or near the path normally taken between customer and commerce systems. The latency within the electronic commerce provider's system is estimated by application tests that correspond to a select and lightweight subset of tasks performed during a typical electronic commerce transaction. In the present embodiment, the application tests are generated by an application monitor agent that is coupled to the electronic commerce provider's access point. This application monitor should be at or near the agent responsible for performing network latency probes. In one embodiment of this invention the two monitors run on the same server. The application monitor sends the application tests and determines the application test latency. More particularly, the application monitor determines the time interval from the time that the application tests are sent until an appropriate response is received. Application test latency reflects an approximation of application latency within the electronic commerce provider's system. The application test provides a measure of the capability of the electronic commerce provider's system to respond to customer orders, and it's performance in relation to a standard subset of a customer order.

The determined network transport latency and the determined application test latency are indicated on a display. In one embodiment, a network transport latency baseline is determined that indicates an average of previously determined values of network transport latency for a given day and time as averaged over a set length of time (in one embodiment, 4 weeks). Also, an application test latency baseline is determined that indicates an average of previously determined values of application test latency for a given day and time. In one embodiment, the network transport latency and application test latency are displayed on the same graph, with network transport latency displayed as percentage deviation from the determined network transport latency baseline and application test latency displayed as a percentage deviation from the application test latency baseline. The use of a standard baseline deviation allows both graphs (of dissimilar data) to be displayed on the same graph and compared with each other.

Because both network latency and application test latency are shown on a single display, a customer service representative can quickly determine the source of a customer's problem by viewing the combined display. Moreover, because network latency and application test latency are indicated relative to a historical baseline (the network latency baseline and the application test baseline), deviations from the normal can be easily and quickly spotted.

Other displays can be generated for quickly and easily determining the cause of any reported problems. In one embodiment, a display that indicates network health can be generated that includes network transport latency, network transport latency baseline, and a network transport latency unloaded baseline. This allows for easily determining the source of problems by spotting deviations between the network transport latency and the network transport latency baseline. Moreover, by also providing the network transport latency unloaded baseline, these deviations can be evaluated relative to the best-case scenario provided by an unloaded network.

A display that indicates application health can be generated that includes application test latency, application test latency baseline, and an application test latency unloaded baseline. This allows for easily determining the source of problems by spotting deviations between the application test latency and the application test latency baseline. Moreover, by also providing the application test latency unloaded baseline, these deviations can be evaluated relative to the best-case scenario provided by an unloaded situation.

Views can also be generated that indicate application component latency. In one embodiment, the total "Application performance" is a sum of multiple application tests—performance tests of multiple application components. In this embodiment, application tests are run on the "Login" process, the "Order" process, the "Configure" process, and the "Help" process. These application components can be viewed on a single graph that shows all application components or on graphs that indicate each application component relative to an application component latency unloaded baseline for that application component.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1:
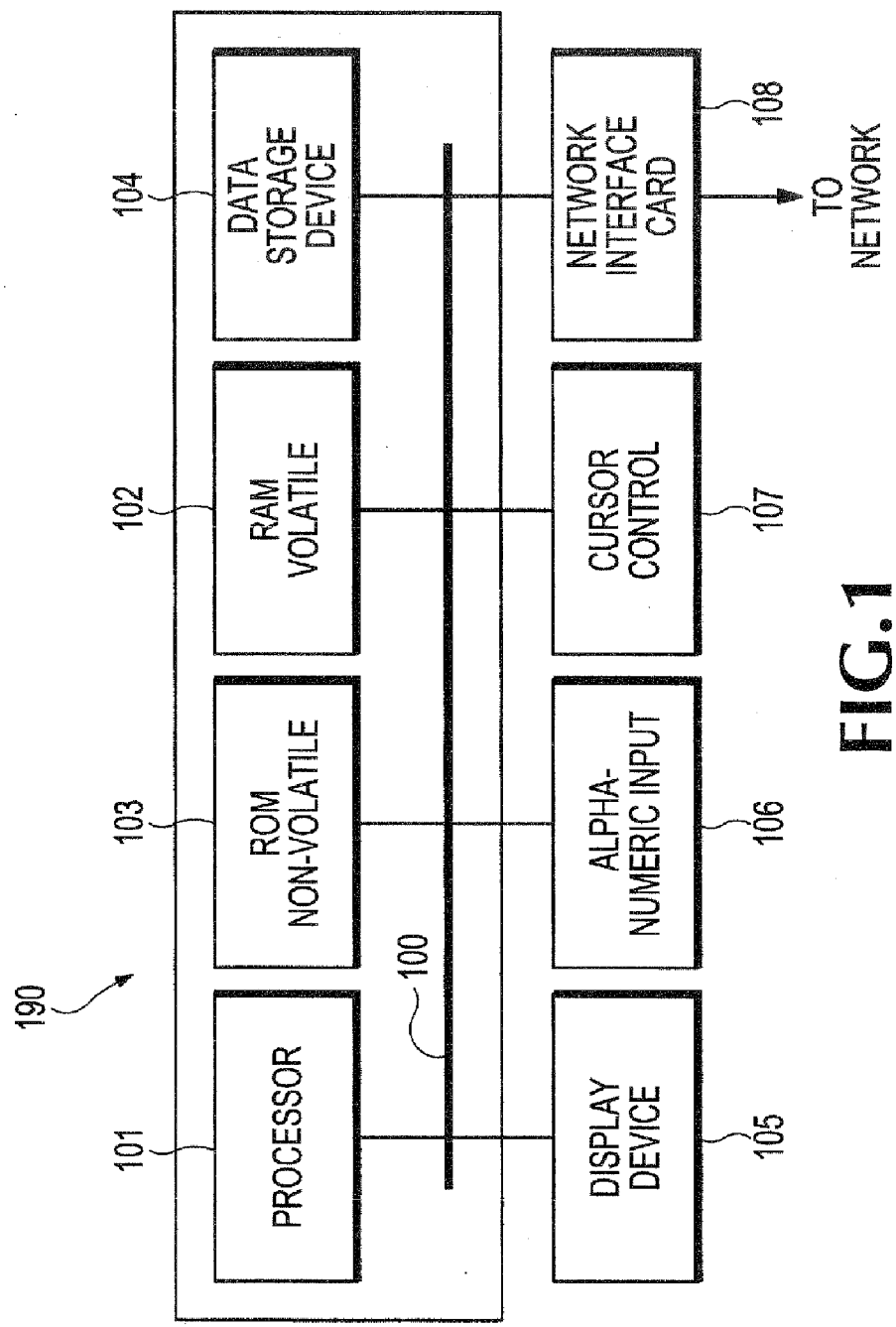
FIG. 1 is a diagram that illustrates an exemplary computer system in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout the present Application, discussions utilizing terms such as "determining," "sending," "calculating," "indicating," "displaying," or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

Refer now to FIG. 1 that illustrates an exemplary computer system 190 upon which embodiments of the present invention may be practiced. In general, computer system 190 comprises bus 100 for communicating information, processor 101 coupled with bus 100 for processing information and instructions, random access (volatile) memory (RAM) 102 coupled with bus 100 for storing information and instructions for processor 101, read-only (non-volatile) memory (ROM) 103 coupled with bus 100 for storing static information and instructions for processor 101, data storage device 104 such as a magnetic or optical disk and disk drive coupled with bus 100 for storing information and instructions, an optional user output device such as display device 105 coupled to bus 100 for displaying information to the computer user, an optional user input device such as alphanumeric input device 106 including alphanumeric and function keys coupled to bus 100 for communicating information and command selections to processor 101, and an optional user input device such as cursor control device 107 coupled to bus 100 for communicating user input information and command selections to processor 101. Furthermore, a network interface card (NIC) 108 is used to couple computer system 190 onto, for example, a client-server computer system network. In such a network, computer system 190 can exemplify a customer computing device and/or a server computer system.

Display device 105 utilized with computer system 190 may be a liquid crystal device, cathode ray tube, or other display device suitable for creating graphic images and alphanumeric characters recognizable to the user. Cursor control device 107 allows the computer user to dynamically signal the two-dimensional movement of a visible symbol (pointer) on a display screen of display device 105. Many implementations of the cursor control device are known in the art including a trackball, mouse, joystick or special keys on alphanumeric input device 106 capable of signaling movement of a given direction or manner of displacement.

FIGS. 2A-2E illustrate methods for monitoring electronic commerce transactions in accordance with one embodiment of the present invention. The methods of FIGS. 2A-2E are illustrated with respect to the structure shown in FIG. 3. However, it is appreciated that methods of FIGS. 2A-2E could be practiced using other structures and systems.

Figure 3:
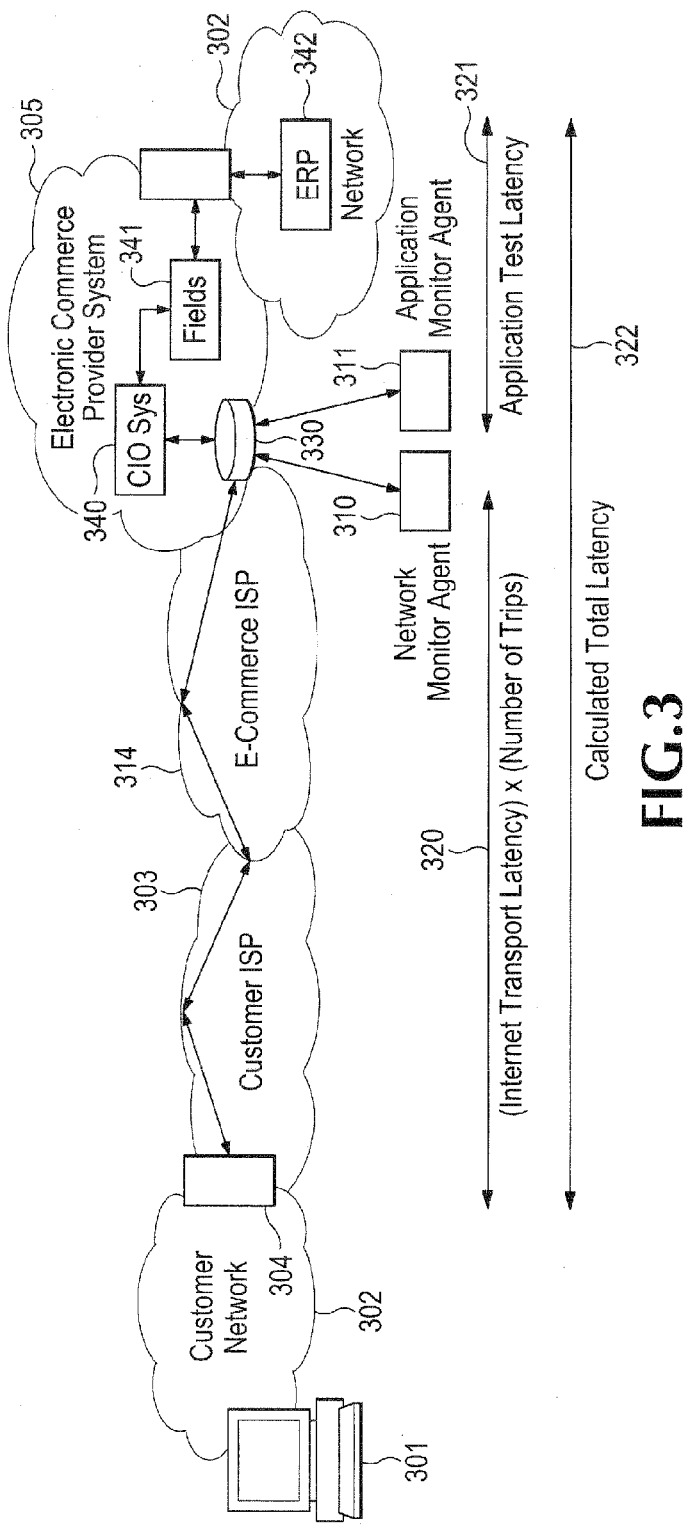
FIG. 3 is a flow chart that illustrates a network monitor agent and an application monitor agent for monitoring electronic commerce transactions between a customer network and a electronic commerce provider system in accordance with one embodiment of the present invention.

FIG. 3 illustrates an exemplary customer computing device 301 that is coupled to a customer network 302 that communicates over the Internet via an Internet Service Provider 303. Communication is coupled to an access point 330 of an electronic commerce provider system 305 via electronic commerce provider's Internet Service Provider 314. In the present embodiment, the electronic commerce provider's ordering system 305 is shown to include a computer system (CIO System) 340 that displays fields 341. In the present embodiment, computer system 340 includes one or more servers (e.g., computer 190 of FIG. 1) that are coupled to or that include one or more database that is operable to store fields 341. In the present embodiment, electronic commerce provider system 305 can be accessed by various other locations within the electronic commerce provider's organization via enterprise resource planning system 342 and communication network 307.

Continuing with FIG. 3, monitoring of electronic commerce transactions is performed by network monitor agent 310 and application monitor agent 311. In one embodiment of the present invention, network monitor agent 310 and application monitor agent 312 are computer programs that are operable on one or more computing device (e.g., computing device 100 of FIG. 1) that is coupled to electronic commerce provider's access point 330.

Communication network 307 and the communications systems that couple customer computing device 301 to network monitor agent 310 and application monitor agent 311 can include the Internet and can include any of a number of different communications systems such as the Plain Old Telephone System (POTS), wireless communication systems (e.g., cellular telephone communication systems and paging systems) and may include one or more Local Area Network (LAN), Wide Area Network (WAN), or other communication system, and may use Ethernet, Transmission Control Protocol/Internet Protocol (TCP/IP), HyperText Transfer Protocol (HTTP) or other communication protocol.

Figure 2A:
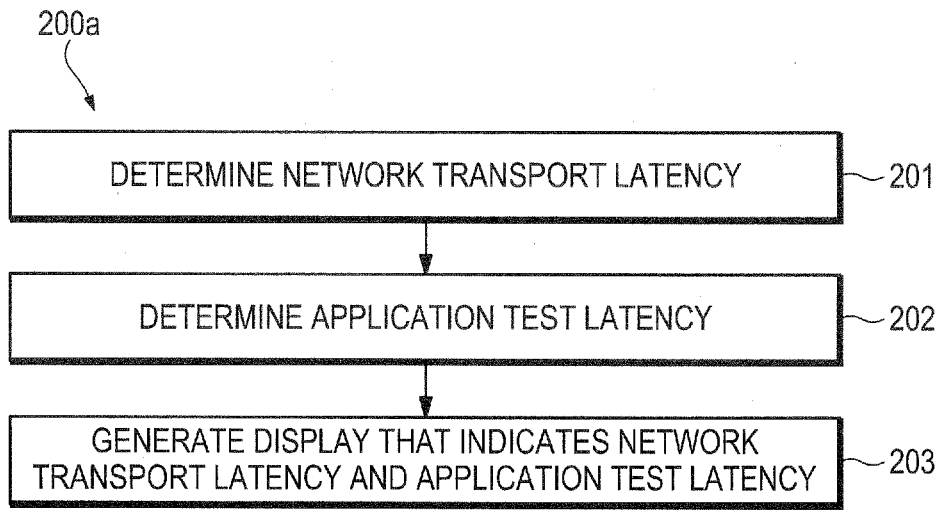
FIG. 2A is a diagram that illustrates a method for monitoring electronic-commerce transactions in accordance with one embodiment of the present invention.

Now referring to method 200a of FIG. 2A, network transport latency is determined as shown by step 201. In the embodiment shown in FIG. 3, network monitor agent 310 is used for determining network transport latency. Network transport latency reflects the time interval from the time that a communication is sent until a return response is received. In the present embodiment, network transport latency is the time interval from the time that a communication is sent from network monitor agent 310, until a response is received at network monitor agent 310. This time interval reflects the transport time between network monitor agent 310 and customer site 304, the time required for a response to be sent from customer site 304, and the time required to receive a response at network monitor agent 310. Because the time interval for coupling communication between network monitor agent 310 and electronic commerce provider's access point 330 is insignificant, network transport latency reflects the time required for a message to travel between customer site 304 and electronic commerce provider's access point 330 as indicated by arrow 320.

Continuing with step 201, in the present embodiment, each customer identifies a Uniform Resource Locator (URL), preferably for a static page, in a web-server located at the customer site (e.g., customer site 302) which can be accessed from an external point (e.g. the e-commerce provider location). The customer site is chosen to be as close as possible to the customer computing device 301 along the communication path between access point 330 and customer computing device 301. Thereby, the recorded latency is representative of the delay experienced by the user of the customer computing device 301 during electronic commerce transactions. The agent issues a HTTP-Head to this URL at regular intervals, records the timestamp and the latency for each HTTP-Head. In the event that a URL is not available, the customer is asked to provide an Internet Protocol (IP) address within their site. When an IP address is used for determining network transport latency, a Ping is issued to the IP-address at regular intervals. The timestamp and the latency for each Ping are then recorded.

In one embodiment, the following pseudo-code is performed by the network monitor agent 310 for determining network transport latency:
On each scheduled time,
Select [URL] from the agent database;
Issue an "HTTP-Head" to [URL] and record [Timestamp];
measure [Delay] until done or [Delay]> [Timeout];
Record [Timestamp], [URL] and [Delay];
Alternatively, the following pseudo-code can be used for issuing a ping (ICMP ECHO):
On each scheduled time,
Select [URL] from the agent database;
Issue a "ping" to [IP] and record [Timestamp];
measure [Delay] until ICMP_EchoReply received or [Delay]> [Timeout];
Record [Timestamp], [IP] and [Delay];
Continuing with FIG. 2A, application test latency is determined as shown by step 202. Application test latency reflects the transaction time for processing a request received from a customer. In the embodiment shown in FIG. 3, application monitor agent 310 is operable for determining application test latency. In one embodiment, network monitoring agent 310 and application monitor agent 311 reside on a server that is located at or near the electronic commerce provider's system access point 330. In one embodiment, a server that is a computing device such as exemplary computing device 190 of FIG. 1 is used. In this embodiment, network monitoring agent 310 and application monitor agent 311 are software programs that are stored in non-volatile memory 103 that are operable for performing method 200a of FIG. 2A. In one embodiment, an oracle database is operable on computing device 100 for storing, in real time, collected data.

Continuing with step 202 of FIG. 2A, in the present embodiment, application test latency is determined by sending one or more application tests and determining the time interval from when the application tests are sent until a response is received. Thus, in the embodiment shown in FIG. 3, application test latency, indicated by arrow 321 of FIG. 3 includes the time from when one or more application tests are sent from application monitor agent 311 until a response is received back at application monitor agent 311. Because the time interval required to sent a communication between application monitor agent 311 is minimal, application test latency reflects the time required to process a request, generate a response and couple the response back to electronic commerce provider's access point 330.

In one embodiment, application tests are requests that operate to request data, in the form of web pages that are formatted in hypertext transfer protocol (HTTP). Application tests are chosen to mimic, as closely as possible, the full range of a customer's interaction with the electronic commerce provider. These application tests are operable for logon, getting an initial web page, creating an order, getting another page, selecting and configuring representative items, getting another page, etc., until a final page is received that represents a finished business transaction. For instance, the application test might generate an order, select and configure items to be purchased (e.g., four routers), submit the order and then check on the order status. In the present embodiment, sufficiently granular application tests are created to represent significant steps of a customer transaction while still being lightweight enough to minimize impact on actual ecommerce applications.

Phantom customer identification numbers, product identification numbers, and configuration parameters are defined in the production system such that the generated orders will represent typical orders and will be non-actionable (i.e., no manufacturing, shipping or billing processes are involved). The application tests are automatically replayed at certain intervals, with the phantom customer's identification number and phantom product identification numbers used to execute each script. In one embodiment, the time required to perform each application test is determined. Alternatively, application tests are grouped and the timer required to perform certain groups of application tests are determined (e.g., grouping login tests, configure tests, order tests, and help tests). In one embodiment, application monitor agent 311 also includes representative delays between transmissions to reflect the time that is required for a customer to enter data.

In one embodiment, the following exemplary pseudo-code is used for determining application test latency. Though these steps could be performed in the sequence shown, in one embodiment, these steps are conducted separately and not necessarily in the sequence shown.

[Login Step]
Record [Timestamp], [Delay] and [Login Step] . . .
[Order Page Step]
Record [Timestamp], [Delay] and [Order Page Step] . . .
[Create Order Items Page]
Record [Timestamp], [Delay] and [Create Order Items Page Step] . . .

As shown by step 203, network transport latency and application test latency are indicated on a display. In one embodiment, network transport latency is displayed as a percentage of the network transport latency baseline and application test latency is shown as a percentage of the application test latency baseline on a single display screen.

Referring to FIG. 3, the combination of network transport latency 320 and application test latency reflects the total latency experienced by a customer, indicated by line 322. Therefore, the display of network transport latency and application test latency is representative of the delays actually experienced by a customer as a result of network delays and application delays. However, it is appreciated that the delay actually experienced by a user will differ as a result of delays within the customer's network 302 and differences between application test latency and the actual application latency during a particular transaction.

FIGS. 4-12 indicate exemplary displays in accordance with embodiments of the present invention. In one embodiment, display device 105 of computer 190 of FIG. 1 is used for generating the displays of FIGS. 4-12. In one embodiment, data generated by network monitor agent 310 and application monitor agent 311 are stored in a database that can be access by communication network 307. Thereby, the displays of FIGS. 4-12 can be viewed at other locations within the enterprise.

Figure 4:
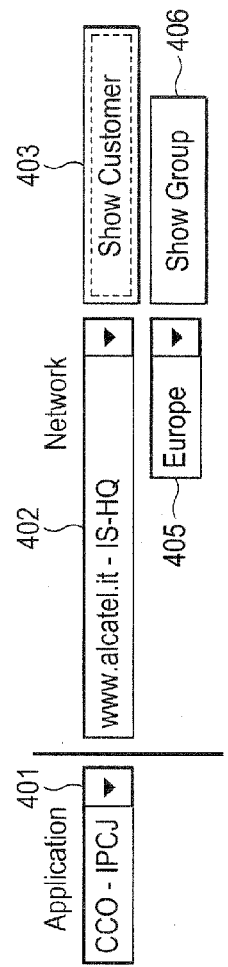
FIG. 4 is a flow chart that illustrates an exemplary display screen that allows for selection of various displays in accordance with one embodiment of the present invention.

Referring now to FIG. 4, a display 400 is shown that includes an application pulldown window 401. Application pulldown menu 401 allows a user to select a desired display. In the present embodiment, application pulldown menu 401 includes selectable icons that allow a user to select any of the displays shown in FIGS. 5-12.

Continuing with FIG. 4, show customer icon 403 is operable to generate a display of a customer list that includes relevant electronic commerce customers. Upon selection of a customer from the customer list, that customer's network is indicated in network window 402. Different networks of a particular customer can be selected by selection of icons viewable using pulldown menu 402.

In the present embodiment, data from electronic commerce customers are grouped (and averaged) geographically, to provide data representing geographic regions and/or countries such as, for example, Europe, China, Asia, South America, etc. In the present embodiment, pulldown menu 405 is operable to select a geographical region and show group icon 406 is operable to indicate the customer sites within the selected group.

Because network latency is available for geographical region, problems experienced by customers that are not directly monitored could be analyzed. In one embodiment of the present invention, in addition to grouping data for geographic regions, data is grouped by primary ISP, giving yet another method for analysis of problems. In this embodiment, primary ISP data can be displayed in the same manner as that of geographic data and measured data.

Figure 2B:
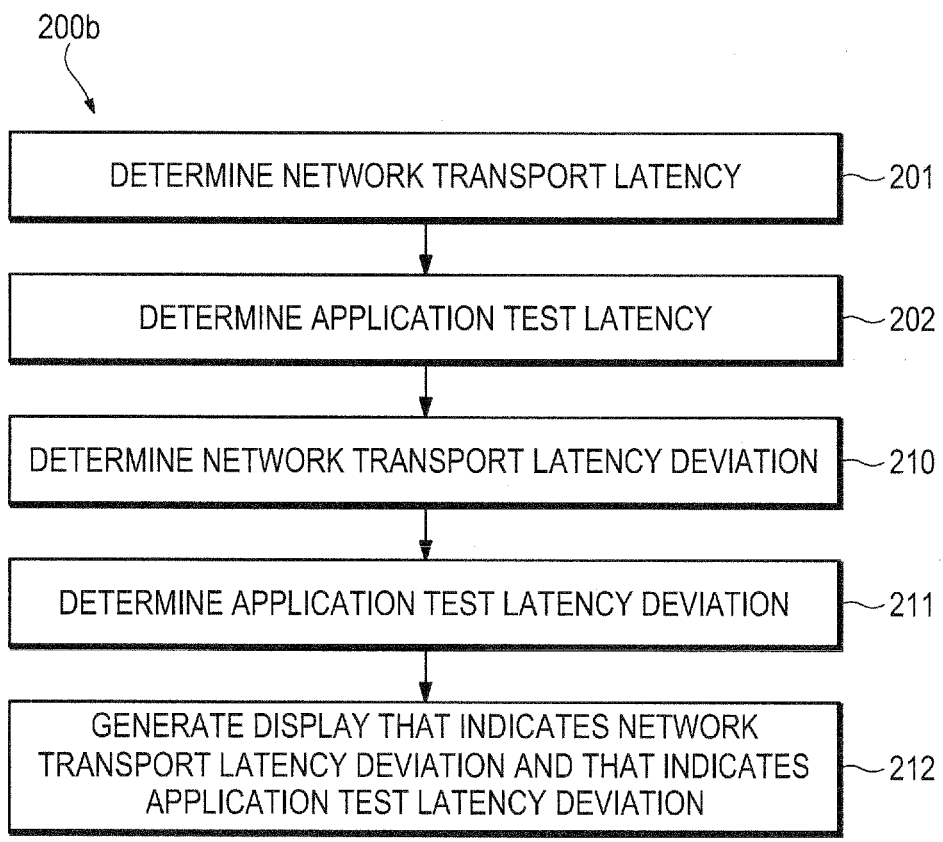
FIG. 2B is a diagram that illustrates a method for monitoring electronic-commerce transactions in which deviation of network transport latency and deviation of application test latency are determined in accordance with one embodiment of the present invention.

FIG. 2B illustrates an embodiment of the present invention in which network transport latency is indicated as a percentage deviation from previously determined network transport latency values and in which application test latency is also indicated as a percentage deviation from previously determined values of application test latency. As shown by steps 201-202, network transport latency and application test latency are determined. Network transport latency deviation is then determined as shown by step 210. In the present embodiment, network transport latency deviation is determined by performing a percentage deviation calculation using previously determined baseline values of network transport latency for a given day and time. The deviation can be taken using data from any representative time period. In one embodiment, the data collected over a one-month period is used. However, alternatively, other time periods can be used. Though the present embodiment uses previously determined values for the same day of the week and for the same given time, alternatively, predetermined values are used based on the same day of the month and the same time.

Continuing with FIG. 2B, an application test latency deviation is determined as shown by step 211. In the present embodiment, application test latency deviation is determined by performing a percentage deviation calculation using application test latency determined in step 202 as compared to previously determined baseline values of application test latency for a given day and time. The deviation can be taken using data from any representative time period. In one embodiment, the data collected over a one-month period is used. However, alternatively, other time periods can be used. Though the present embodiment uses previously determined values for the same day of the week and for the same given time, alternatively, predetermined values are used based on the same day of the month and the same time.

Figure 5:
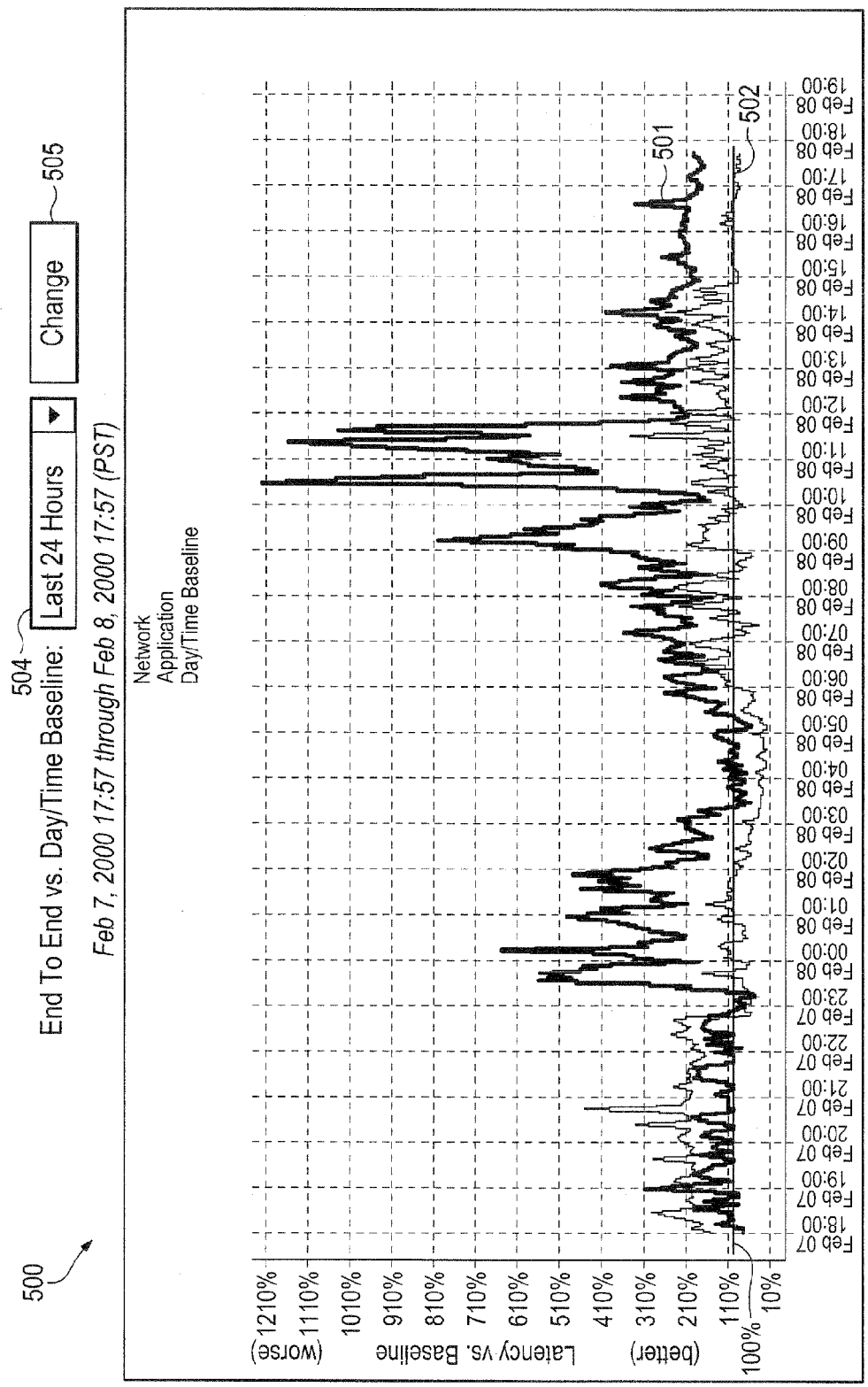
FIG. 5 is a diagram that illustrates an exemplary display that indicates both network transport latency and application test latency in accordance with one embodiment of the present invention.

A display is generated as shown by step 212 that indicates the deviation of network transport latency and that indicates the deviation of application test latency. FIG. 5 shows an exemplary display 500 that indicates the deviation of network transport latency as network transport latency deviation curve 501 and that indicates the deviation of application test latency as application test latency deviation curve 502. Application test latency is labeled as "application latency" on the display to indicate that application test latency is representative of application latency.

Continuing with FIG. 5, the time period is shown to be 24 hours. However, other time periods can also be selected. In the present embodiment, a pop-up menu 504 is displayed along with a change button 505 that can be selected. A user can change the time period by making a desired selection from the pop-up menu 504 and selecting the change button 505. In one embodiment, pop-up menu 504 includes a default time period of 24 hours and selectable time periods of 2, 4, or 7 days, and allows for selection of any custom time span.

Figure 2C:
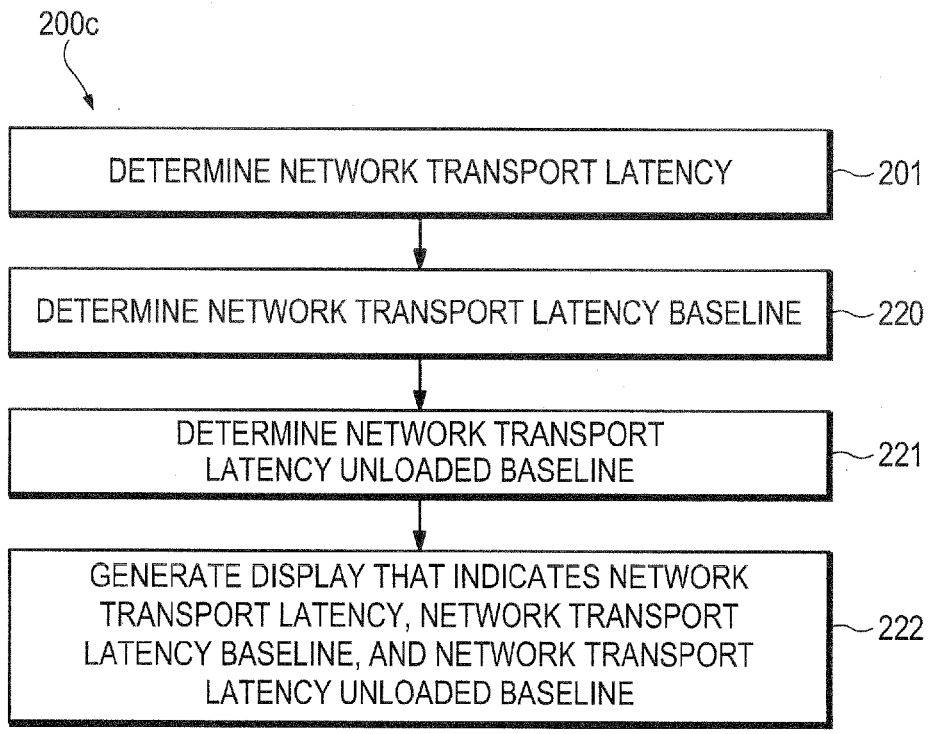
FIG. 2C is a diagram that illustrates a method for monitoring electronic-commerce transactions in which network transport latency; network transport latency baseline and network transport latency unloaded baseline are indicated in accordance with one embodiment of the present invention.

Referring now to method 200c of FIG. 2C, an embodiment of the present invention is illustrated in which a display is generated that indicates network transport latency, network transport latency baseline, and network transport latency unloaded baseline. As shown by steps 201 and 210, network transport latency and network transport latency baseline are determined.

A network transport latency baseline is then determined as shown by step 220. In the present embodiment, network transport latency baseline is determined by taking an average of previously determined values of network transport latency for a given day and time. The day can be day of the week or day of the month. The average can be taken over any representative time period. In one embodiment, the average is taken over a one-month period using previously determined values of network transport for each particular day of the week and time. However, alternatively, other time periods can be used.

Continuing with method 200c, network transport latency unloaded baseline is determined as shown by step 221. In the present embodiment, network transport latency unloaded baseline is determined by taking the lowest determined network transport latency (step 201) during a given time period. The network transport latency unloaded baseline indicates the best-case or "unloaded" value for network transport latency.

Figure 6:
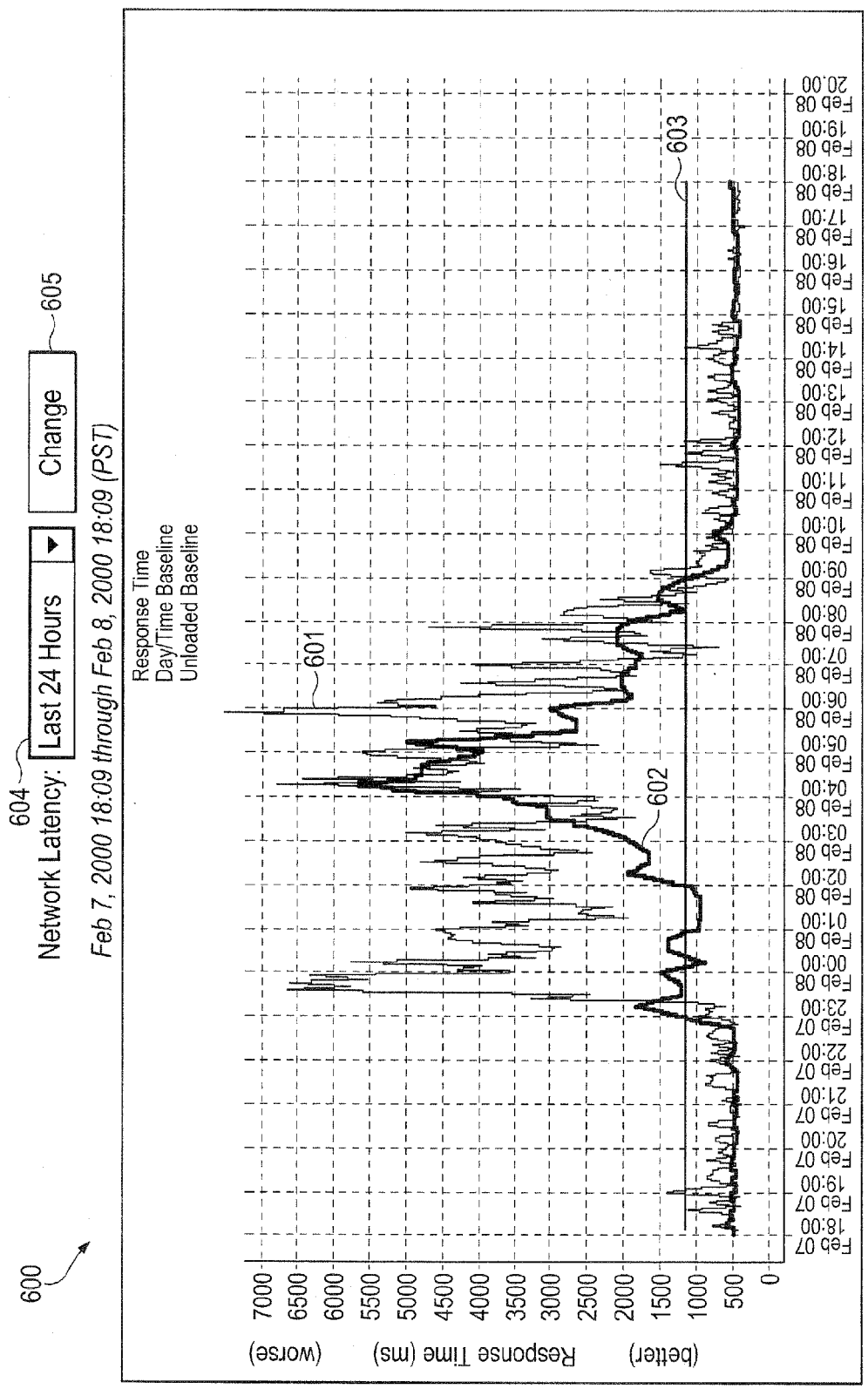
FIG. 6 is a flow chart that illustrates network transport latency; network transport latency baseline and network transport latency unloaded baseline for a twenty four hour period in accordance with one embodiment of the present invention.

A display is generated as shown by step 222 that indicates network transport latency, network transport latency baseline, and network transport latency unloaded baseline. FIG. 6 shows an exemplary display 600 that includes a single graph that indicates network transport latency (curve 601), network transport latency baseline (curve 602) and network transport latency unloaded baseline (curve 603). In the present embodiment, network transport latency 601, network transport latency baseline line 602 and network transport latency unloaded baseline 603 are indicated as a function of response time in milliseconds for a time period that is indicated on the horizontal axis. In the present embodiment, the time period is 24 hours. However, other time periods can also be used. In the present embodiment, a pop-up menu 604 is displayed along with a change button 605 that can be selected. A user can change the time period by making a desired selection from the pop-up menu 604 and selecting the change button 605.

Figure 2D:
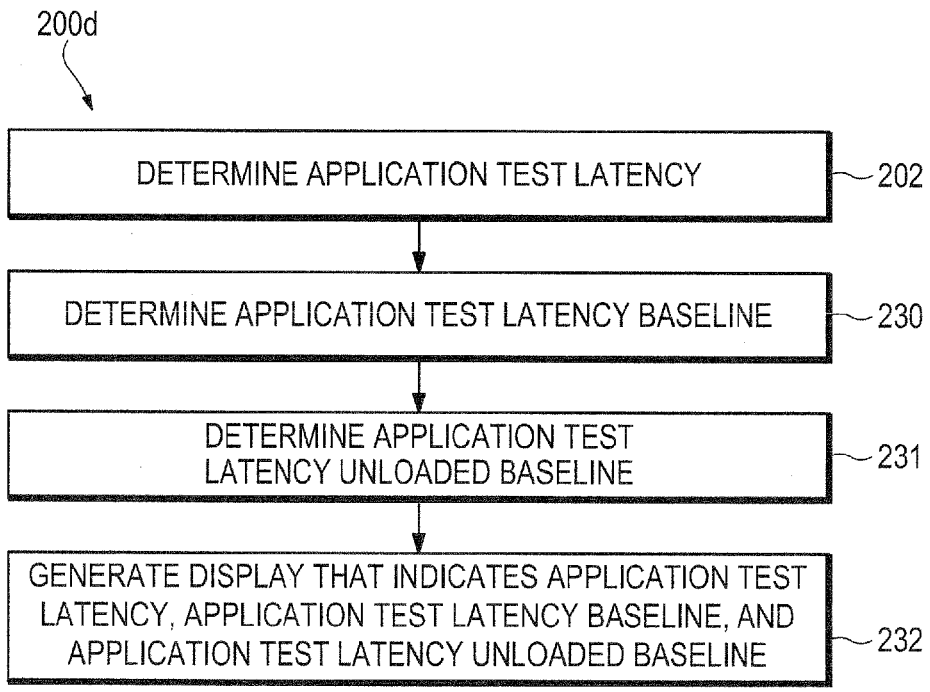
FIG. 2D is a diagram that illustrates a method for monitoring electronic-commerce transactions in which application test latency, application test latency baseline and application test latency unloaded baseline are indicated in accordance with one embodiment of the present invention.

Referring now to method 200d of FIG. 2D, an embodiment of the present invention is illustrated in which a display is generated that indicates application test latency, application test latency baseline, and application test latency unloaded baseline. As shown by steps 202, application test latency is determined.

Continuing with FIG. 2D, application test latency baseline is determined as shown by step 230. In the present embodiment, application test latency baseline is determined by taking an average of previously determined values of application test latency for a given day and time. The day can be day of the week or day of the month. The average can be taken over any representative time period. In one embodiment, the average is taken over a one-month period using previously determined application test latency values for a particular day of the week and time. However, alternatively, other time periods can be used.

Continuing with method 200d, application test latency unloaded baseline is determined as shown by step 231. In the present embodiment, application test latency unloaded baseline is determined by taking the lowest determined application test latency (step 202) during a given time period. The application test latency unloaded baseline indicates the best-case or "unloaded" value for network transport latency.

Figure 7:
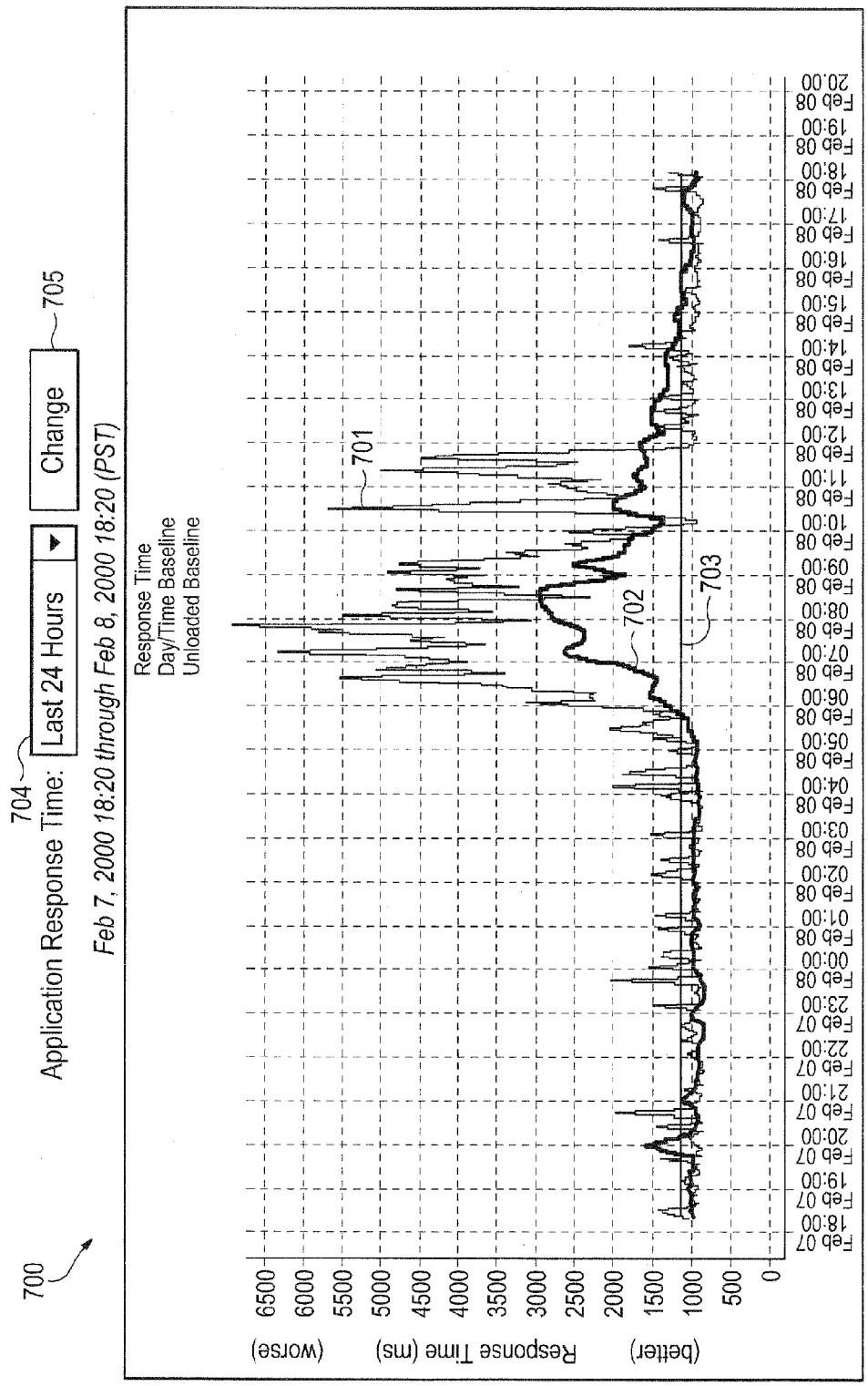
FIG. 7 is a flow chart that illustrates application test latency; application test latency baseline and application test latency unloaded baseline for a twenty four hour period in accordance with one embodiment of the present invention.

A display is generated as shown by step 231 that indicates application test latency, application test latency baseline, and application test latency unloaded baseline. FIG. 7 shows an exemplary display 700 that includes a single graph that indicates application test latency (curve 701), application test latency baseline (curve 702) and application test latency unloaded baseline (curve 703). In the present embodiment, application test latency curve 701, application test latency baseline curve 702 and application test latency unloaded baseline curve 703 are indicated as a function of response time in milliseconds for a time period that is indicated on the horizontal axis. In the present embodiment, the time period is 24 hours. However, other time periods can also be used. In the present embodiment, a pop-up menu 704 is displayed along with a change button 705 that can be selected. A user can change the time period by making a desired selection from the pop-up menu 704 and selecting the change button 705.

Figure 2E:
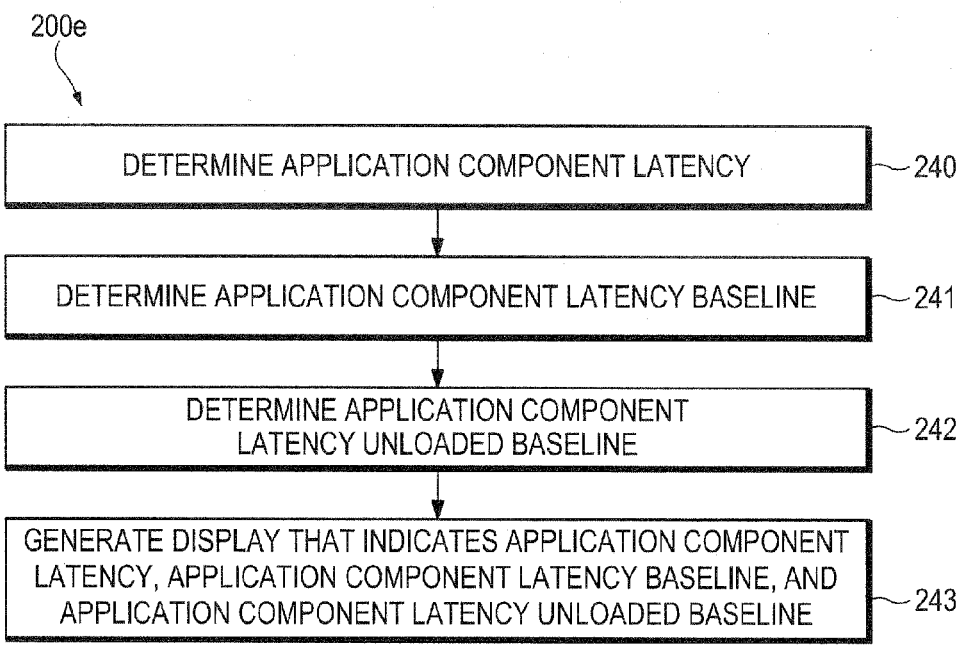
FIG. 2E is a diagram that illustrates a method for monitoring electronic-commerce transactions in which application component latency; application component latency baseline and application component latency unloaded baseline are indicated in accordance with one embodiment of the present invention.

FIG. 2E illustrates an embodiment in which application component latency is determined as shown by step 240. In the embodiment shown in FIG. 3, application monitor agent 311 measures the latencies (response times) at the level of each component for determining application component latency for each of a plurality of application components. More particularly, application test is generated and sent that represents each application component. The time at which the application test is sent is recorded and the time required to receive a response from the electronic commerce provider system 305 is the application component latency. In one embodiment, application components include login, order, configure and help. In this embodiment, a login application component latency is determined, an order application component latency is determined, a configure application component latency, and a help application component latency are determined. These components are then summarized to obtain the overall application test latency.

Figure 8:
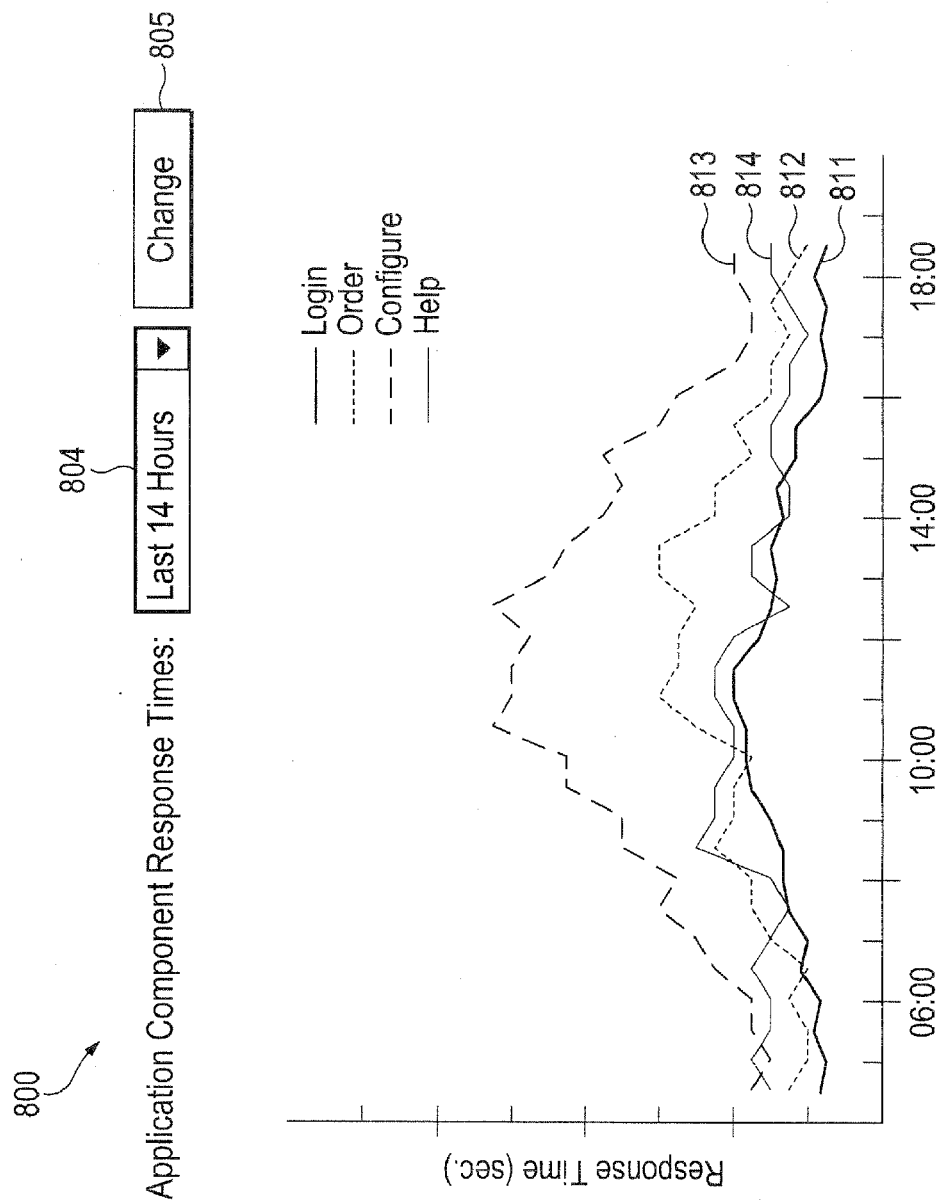
FIG. 8 is a flow chart that illustrates application component latency for a login application component, an order application component, a configure application component, and a help application component for a fourteen hour period in accordance with one embodiment of the present invention.

FIG. 8 shows an exemplary display of application component latencies for login, order, configure and help application components. Login application component latency 811 is shown to be displayed along with order application component latency 812, a configure application component latency 813 and a help application component latency 814. Application component latency is measured in milliseconds and is illustrated for a fourteen hour period. However, other time periods can be viewed by making a desired selection from the pop-up menu 804 and selecting the change button 805.

Now referring to step 241 of FIG. 200e, an application component latency baseline is determined. In the present embodiment, application component latency baseline is determined for each application component by calculating an average of previously observed values for each particular day and time. The previously observed values can be values for either the same day of the week or for the same day of the month. In one embodiment, application component latency baselines are determined for each application component and are summed to determine the application test latency baseline.

As shown by step 242 of FIG. 200e, an application component latency unloaded baseline is determined. In the present embodiment, application component latency unloaded baseline is determined by taking the lowest determined application component latency (step 240) during a given time period. This is done for each application component so as to obtain an application component latency unloaded baseline for each application component. The application component latency unloaded baseline indicates the best-case or "unloaded" value for latency.

A display is then generated that indicates application component latency, application component latency baseline, and application component latency unloaded baseline as shown by step 243. The displays of FIGS. 9-12 illustrate exemplary displays that illustrate application component latency, application component latency baseline, and application component latency unloaded baseline.

Figure 9:
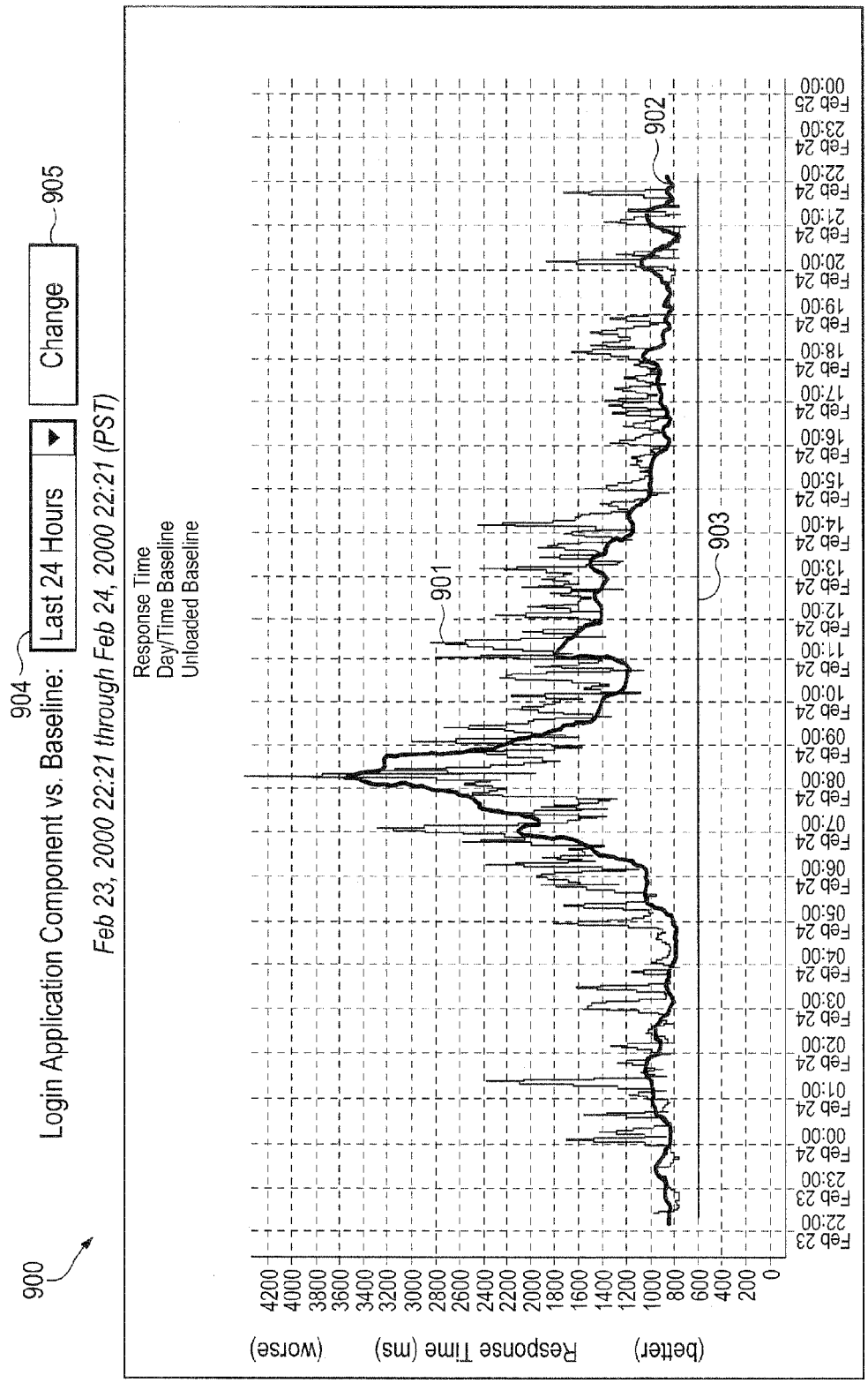
FIG. 9 is a flow chart that illustrates application component latency for a login application component relative to a login application component latency baseline and relative to an login application component latency unloaded baseline for a twenty four hour period in accordance with one embodiment of the present invention.
Figure 10:
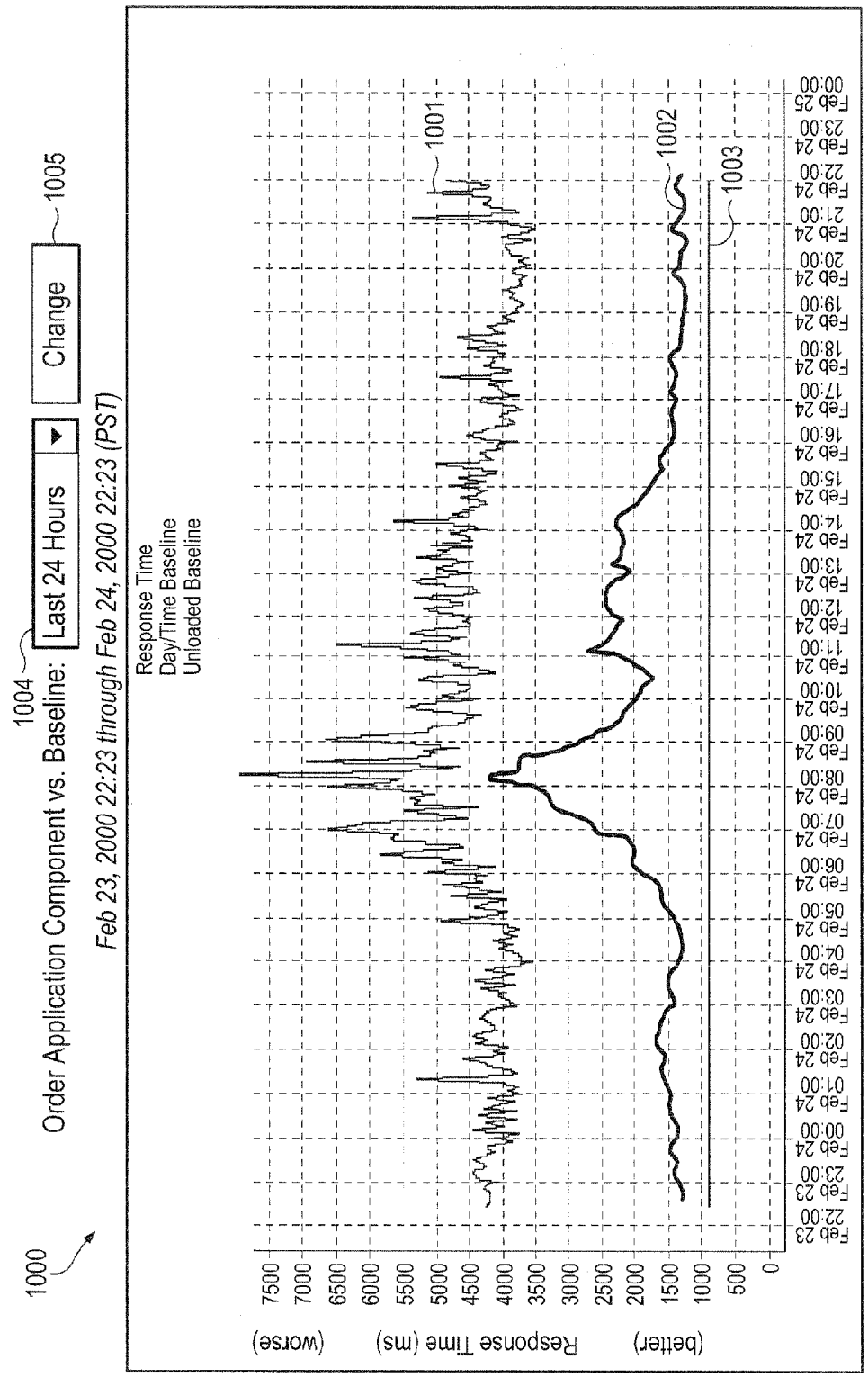
FIG. 10 is a flow chart that illustrates application component latency for an order application component relative to an order application component latency baseline and relative to an order application component latency unloaded baseline for a twenty four hour period in accordance with one embodiment of the present invention.

In the present embodiment, the icons "Login", Order," "Configure," or help can be selected form display 800 of FIG. 8 to obtain the views illustrated in FIGS. 9-12. For example, by selecting "Login" from display 800 of FIG. 8, display 900 of FIG. 9 is obtained. Similarly, by selecting "Order" from display 800 of FIG. 8, display 1000 of FIG. 10 is obtained. Likewise, selection of "Configure" from display 800 of FIG. 8, gives display 1100 of FIG. 11 and selection of "Help" from display 800 of FIG. 8, gives display 1200 of FIG. 12.

Referring now to FIG. 9, a display 900 is shown that includes a login component latency 901, a log in component latency baseline 902, and a login component latency unloaded baseline 903. Login component latency 901 reflects the time required to perform the application test associated with logging into the electronic commerce provider's system. Login component latency baseline 902 reflects an average or typical time required to perform the application test associated with the task of logging into the electronic commerce provider's system. Similarly, login component latency unloaded baseline 903 indicates an unloaded or best-case latency for performing the application test associated with the task of logging into the electronic commerce provider's system.

Continuing with FIG. 9, the horizontal axis illustrates a twenty four hour time period. However, other time periods can be viewed by making a desired selection from the pop-up menu 904 and selecting the change button 905.

Display 1000 of FIG. 10 shows an order component latency 1001, an order component latency baseline 1002, and an order component latency unloaded baseline 1003. The horizontal axis illustrates a twenty four hour time period. However, other time periods can be viewed by making a desired selection from the pop-up menu 1004 and selecting the change button 1005.

Order component latency 1001 reflects the time required to perform the application test associated with ordering using the electronic commerce provider's system. Order component latency baseline 1002 reflects an average or typical time required to perform the application test associated with the task of ordering from the electronic commerce provider's system. Similarly, order component latency unloaded baseline 1003 indicates an unloaded or best-case latency for performing the application test associated with the task of ordering from the electronic commerce provider's system.

Figure 11:
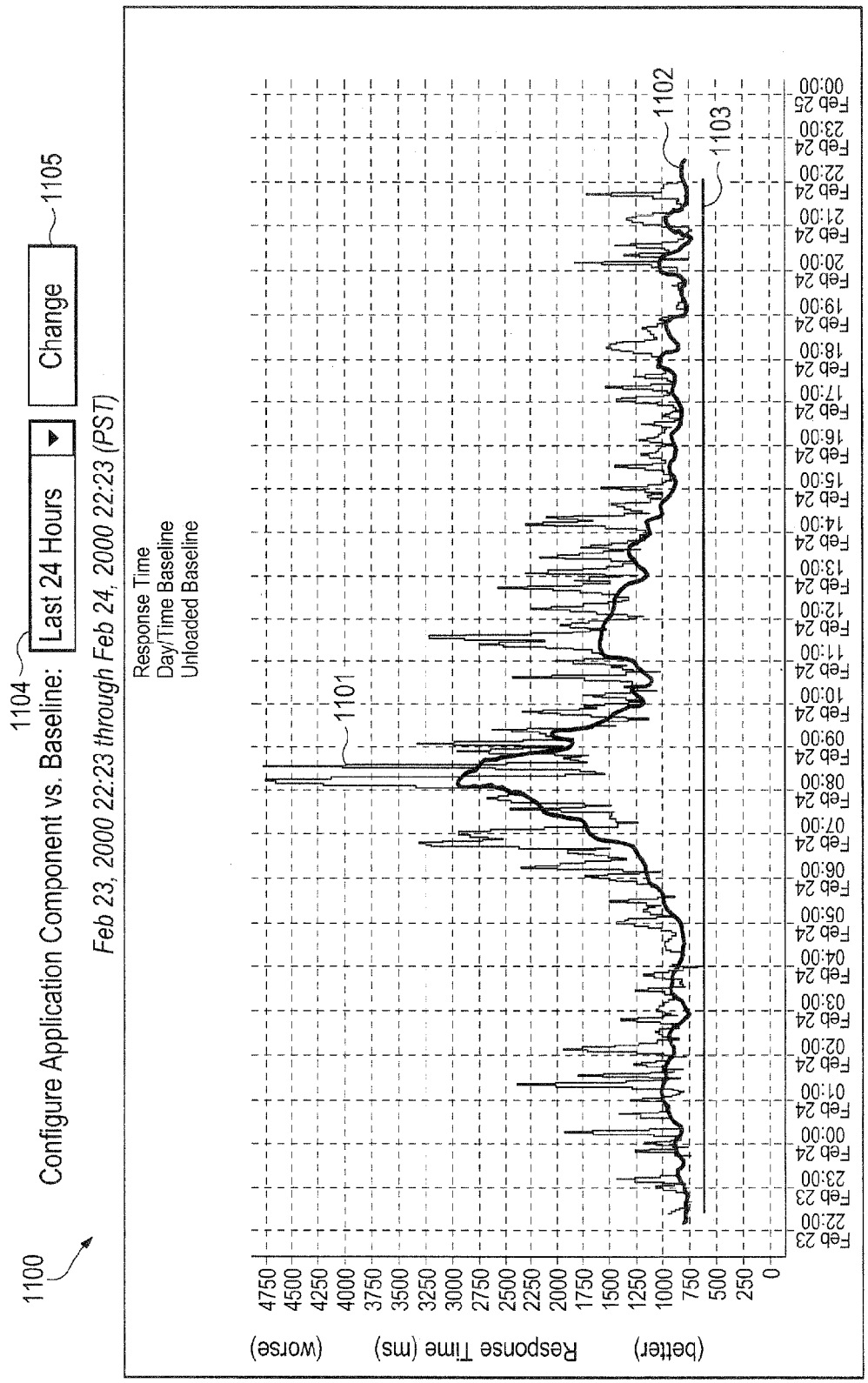
FIG. 11 is a flow chart that illustrates application component latency for a configure application component relative to a configure application component latency baseline and relative to an configure application component latency unloaded baseline for a twenty four hour period in accordance with one embodiment of the present invention.

Referring now to FIG. 11, a configure component latency 1101, a configure component latency baseline 1102, and a configure component latency unloaded baseline 1103 are shown. The horizontal axis illustrates a twenty four hour time period. However, other time periods can be viewed by making a desired selection from the pop-up menu 1104 and selecting the change button 1105.

Continuing with FIG. 11, configure component latency 1101 reflects the time required to perform the application test associated with configuring an order using the electronic commerce provider's system. Configure component latency baseline 1102 reflects an average or typical time required to perform the application test associated with the task of configuring an order from the electronic commerce provider's system. Similarly, configure component latency unloaded baseline 1103 indicates an unloaded or best-case latency for performing the application test associated with the task of configuring an order using the electronic commerce provider's system.

Figure 12:
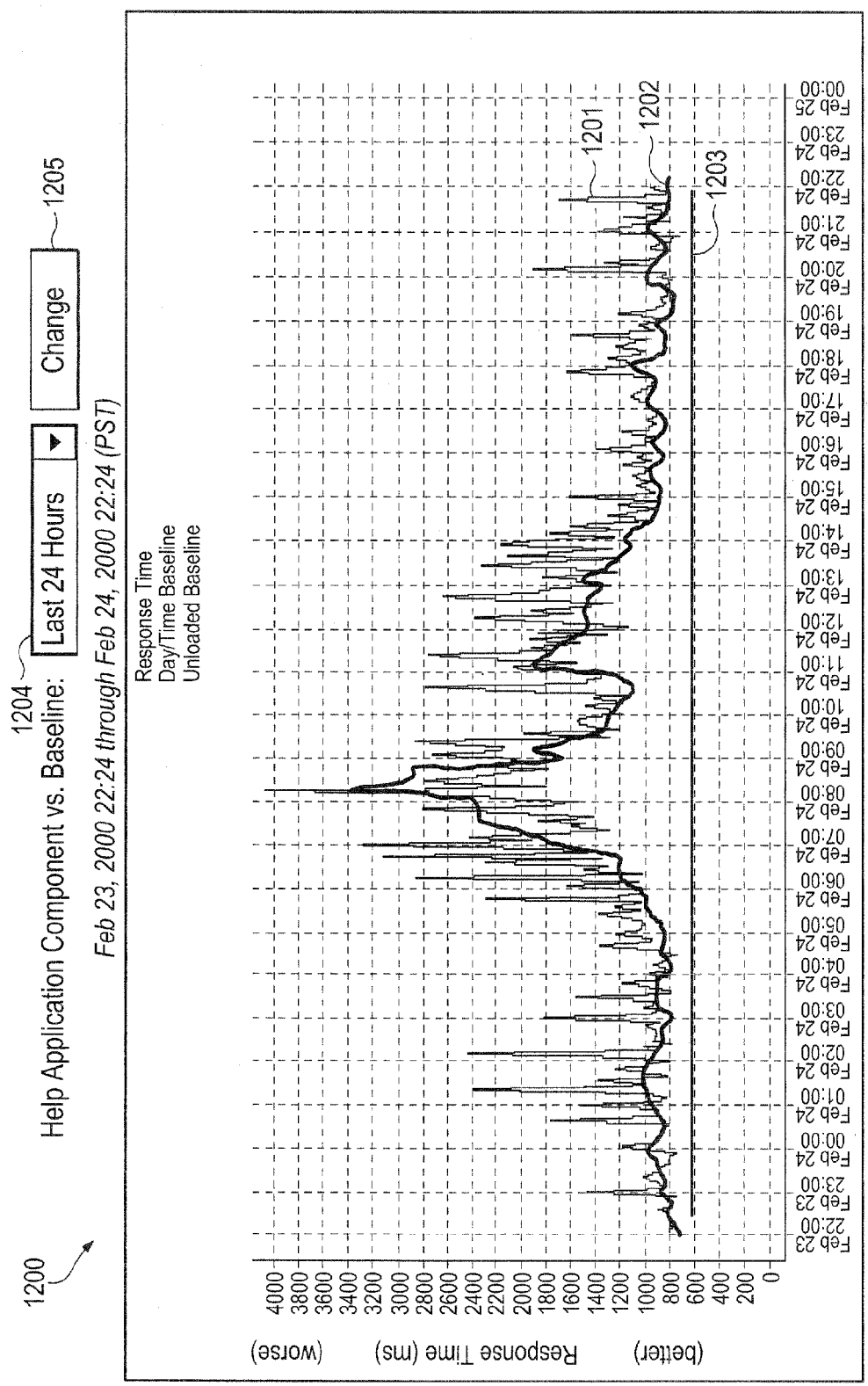
FIG. 12 is a flow chart that illustrates application component latency for a help application component relative to a help application component latency baseline and relative to an help application component latency unloaded baseline for a twenty four hour period in accordance with one embodiment of the present invention.

As shown by display 1200 of FIG. 12, a help component latency 1201, a help component latency baseline 1202 and a help component latency unloaded baseline 1203 are illustrated. The horizontal axis illustrates a twenty four hour time period. However, other time periods can be viewed by making a desired selection from the pop-up menu 1204 and selecting the change button 1205.

Continuing with FIG. 12, help component latency 1201 reflects the time required to perform the application test associated with the help function using the electronic commerce provider's system. Help component latency baseline 1202 reflects an average or typical time required to perform the application test associated with the help function using the electronic commerce provider's system. Similarly, help component latency unloaded baseline 1203 indicates an unloaded or best-case latency for performing the application test associated with the help function using the electronic commerce provider's system.

Display 500 of FIG. 5 provides for easy isolation of many customer problems. More particularly, when application test latency percentage curve 502 has a higher deviation from its baseline than that of network latency curve 501, it could be interpreted as an indication that the application is the main contributing factor to the problem.

Further analysis is then easily accomplished by drilling-down to the application view, for example, starting with display 700 of FIG. 7, moving to display 900 of FIG. 9, and progressing to views of application components as shown in displays 9-12. By drilling-down to the application views of FIGS. 9-12, a visual correlation can be made between the observed data and the profiled and unloaded baseline latencies.

When network transport latency percentage curve 602 of FIG. 5 has a higher deviation from its baseline than that of application test latency, it indicates a possible cause as either the Internet or the customer's network. To further analyze this situation, view of display 600 of FIG. 6 provides a view that contrasts the latency observed today with the unloaded and profiled baseline values for this customer site.

When a problem is reported by a customer and analysis of display 500 of FIG. 5 shows no significant deviation for either network transport latency or application test latency from their baseline values, the problem can be various factors within the customer's own network. Examples of problems within the customer's network include connectivity problems with the customer's access to the Internet, (e.g., proxy configuration, SSL, firewall, insufficient bandwidth to support peak traffic periods, etc.), problems with the customer's PC setup (e.g., OS version, browser version, graphic and/or system memory), as well as the possibility that the customer is ordering an unusually complex product configuration or an unusually large number of products.

In the present embodiment, while it is desirable to gather information in real-time, this need is balanced against the extra load on the production system imposed by the monitoring. In one embodiment, a monitoring interval of between 15 seconds and twenty minutes is used. This monitoring interval is configurable by customer such that monitoring intervals can be easily varied according to the needs of each customer.

Accordingly, the method and apparatus of the present invention provides an end-to-end measure that is representative of the customer's actual experience. Also, no agents or portions of agents will reside on any servers or machines at the customer's network. Therefore, there is little intrusion into the customer's operations. Also, the network monitor agent and the application monitor agent of the present invention are separated from the electronic commerce provider's system, preventing potential burden on the electronic commerce provider's system.

The preferred embodiment of the present invention, a method and apparatus for monitoring electronic commerce transactions, is thus described. While the present invention has been described in particular embodiments, it should be appreciated that the present invention should not be construed as limited by such embodiments, but rather construed according to the below claims.

We claim:

1. A method comprising:
   simulating a transaction between a customer and one or more electronic commerce servers located in an enterprise network, said simulation performed using an access device located on a perimeter of the enterprise network;

wherein said simulation using the access device measures performance of an electronic commerce application independently of network conditions outside the enterprise network;

pinging a customer network using the same access device used for said simulation;

wherein said pinging measures network transport latency between the access device and the customer network independently of latency associated with the electronic commerce application;

outputting said application performance measurement and said network transport latency measurement;

identifying a time of day associated with the measurements;

determining a first network transport latency baseline using previously determined values of network transport latency for the identified time of day, the first network transport latency baseline indicating an expected transport latency for the identified time of day;

determining a first application performance baseline using previously determined values of application performance measurements for the identified time of day, the first application performance baseline indicating an expected application performance for the identified time of day;

determining percentage deviation of said determined network transport latency measurement from the determined first network transport latency baseline;

determining percentage deviation of said application performance measurement from the determined first application performance baseline; and outputting the measurements and the determined percentage deviations.

2. The method of claim 1 wherein said method further includes:

calculating a second different network transport latency baseline, said second network transport latency baseline indicating the lowest measured network transport latency during a given time period; and displaying the network transport latency measurement and said network transport latency baselines.

3. The method of claim 2 wherein a single graph is displayed that indicates the network transport latency measurement and the network transport latency baselines.

4. The method of claim 1 wherein said method further includes:

calculating a second different application performance baseline, said second application performance baseline indicating the lowest measured application performance during a given time period; and displaying the application performance measurement and said application performance baselines.

5. The method of claim 4 wherein a single graph is displayed that indicates said application performance measurement and the application performance baselines.

6. The method of claim 1 further comprising measuring application performance for each of a plurality of application components and wherein said application performance measurements for each of said plurality of application components is displayed.

7. The method of claim 6 wherein a first application component performance baseline is determined for each of said plurality of application components.

8. The method of claim 7 wherein a second application component latency baseline is determined for each of said plurality of application components and wherein said second application component latency baseline for each of said plurality of application components is displayed.

9. The method of claim 8 wherein a graph is generated for each application component that includes the application component's application component performance, first application component latency performance and second application component performance baseline.

10. The method of claim 9 wherein said application components include a login component, an order component, a configure component and a help component.

11. A computer system comprising:

a bus;

a memory unit coupled to said bus, said memory unit including instructions for determining latency associated with a communication path extending between a customer network and one or more enterprise servers;

one or more processors coupled to said bus, the processors for executing said instructions, and when executing said instructions, operable to:

determine network transport latency between the computer system and a network device located between a remote customer network and another network, said network latency corresponding to a first leg of the communication path, the first leg extending between the computer system and the remote customer network;

transmit an application test from said computer system to said electronic commerce servers, wherein said application test is selected to represent at least a portion of said electronic commerce transactions;

receive back a test response from the electronic commerce servers, the response for the application test;

determine application test latency according to the received test response, wherein said application test latency corresponds to only a second leg of the communication path, the second leg extending from the computer system to the enterprise servers;

determine a first network transport latency baseline that indicates an average of previously determined values of network transport latency for a given day and time;

determine a first application test latency baseline that indicates an average of previously determined values of application test latency for a given day and time;

display said network transport latency, said application test latency, and said baselines;

determine deviation of said determined network transport latency from the previously determined values of network transport latency for the given day and time;

determine deviation of said determined application test latency from the previously determined values of said application test latency for the given day and time; and display said determined deviation of said network transport latency and display said determined deviation of said application test latency.

12. The computer system as recited in claim 11 wherein the processors are further operable to:

calculate a second different network transport latency baseline, said second network transport latency baseline indicating the lowest calculated network transport latency during a given time period; and display said network transport latency, said first network transport latency baseline and said second network transport latency baseline on a same graph.

13. The computer system as recited in claim 11 wherein the processors are further operable to:
    calculate a second different application test latency baseline, said second application test latency baseline indicating the lowest calculated application test latency during a given time period; and
    display said application test latency, said first application test latency baseline and said second application test latency baseline on a same graph.

14. The computer system as recited in claim 11 wherein the processors are further operable to:
    determine and display different application component latencies for each of a plurality of application components.

15. The computer system as recited in claim 14 wherein the processors are further operable to:
    determine first application component latency baselines and second application component latency baselines for each of the plurality of application components; and
    generate a graph for each of said plurality of application components, each graph including one of the application component's application component latency, first application component latency baseline and second application component latency baseline.

* * * * *